US007317871B2

(12) United States Patent
Tennison et al.

(10) Patent No.: US 7,317,871 B2

(45) Date of Patent: Jan. 8, 2008

(54) HEATER FOR FLUIDS COMPRISING AN ELECTRICALLY CONDUCTIVE POROUS MONOLITH

(75) Inventors: Stephen Robert Tennison, Addlestone (GB); Andrew John Blackburn, Winchester (GB); Tho Truong Huynh, Millbrook (GB); Piers Catton, Gosport (GB); Vladimir Strelko, Jr., Basingstoke (GB); Jonathan Robert Tunbridge, Yateley (GB)

(73) Assignee: Mast Carbon International, Ltd., Plymouth, Devon (GB)

( * ) Notice: Subject to any disclaimer, the term of this patent is extended or adjusted under 35 U.S.C. 154(b) by 0 days.

(21) Appl. No.: 10/557,919

(22) PCT Filed: May 19, 2004

(86) PCT No.: PCT/GB2004/002157

§ 371 (c)(1),
(2), (4) Date: Apr. 4, 2006

(87) PCT Pub. No.: WO2004/105439

PCT Pub. Date: Dec. 2, 2004

(65) Prior Publication Data

US 2007/0056954 A1 Mar. 15, 2007

(30) Foreign Application Priority Data

May 21, 2003 (GB) ................................ 0311675.3
Aug. 29, 2003 (GB) ................................ 0320280.1

(51) Int. Cl.
*A47J 31/00* (2006.01)

(52) U.S. Cl. ....................................... 392/465; 392/466

(58) Field of Classification Search ..................... None
See application file for complete search history.

(56) References Cited

U.S. PATENT DOCUMENTS

| | | | | |
|---|---|---|---|---|
| 4,212,275 | A * | 7/1980 | Inoue | 123/549 |
| 4,917,835 | A | 4/1990 | Lear et al. | |
| 4,950,558 | A | 8/1990 | Sarin | |
| 5,025,923 | A | 6/1991 | Okui | |
| 5,187,142 | A | 2/1993 | Richmond et al. | |
| 5,231,968 | A * | 8/1993 | Siefkes | 123/549 |
| 5,914,294 | A | 6/1999 | Park et al. | |
| 6,097,011 | A | 8/2000 | Gadkaree et al. | |
| 6,284,705 | B1 | 9/2001 | Park et al. | |
| 6,582,796 | B1 | 6/2003 | Joulin et al. | |
| 6,859,617 | B2 * | 2/2005 | Goodsel et al. | 392/478 |
| 6,964,695 | B2 * | 11/2005 | Place et al. | 95/143 |
| 2004/0045438 | A1 | 3/2004 | Place et al. | |
| 2005/0126395 | A1 | 6/2005 | Blackburn et al. | |

FOREIGN PATENT DOCUMENTS

| | | |
|---|---|---|
| EP | 0 310 043 | 4/1989 |
| EP | 0 684 071 | 11/1995 |
| WO | WO 99/62616 | 12/1999 |
| WO | WO 02/072240 | 9/2002 |

* cited by examiner

*Primary Examiner*—Thor S. Campbell
(74) *Attorney, Agent, or Firm*—Bartlett & Sherer; Ronald B. Sherer; Gerow D. Brill

(57) ABSTRACT

An electrical heater element of controlled resistivity which can be used for a wide range of applications is formed from an electrically conductive synthetic porous carbon monolith.

18 Claims, 14 Drawing Sheets

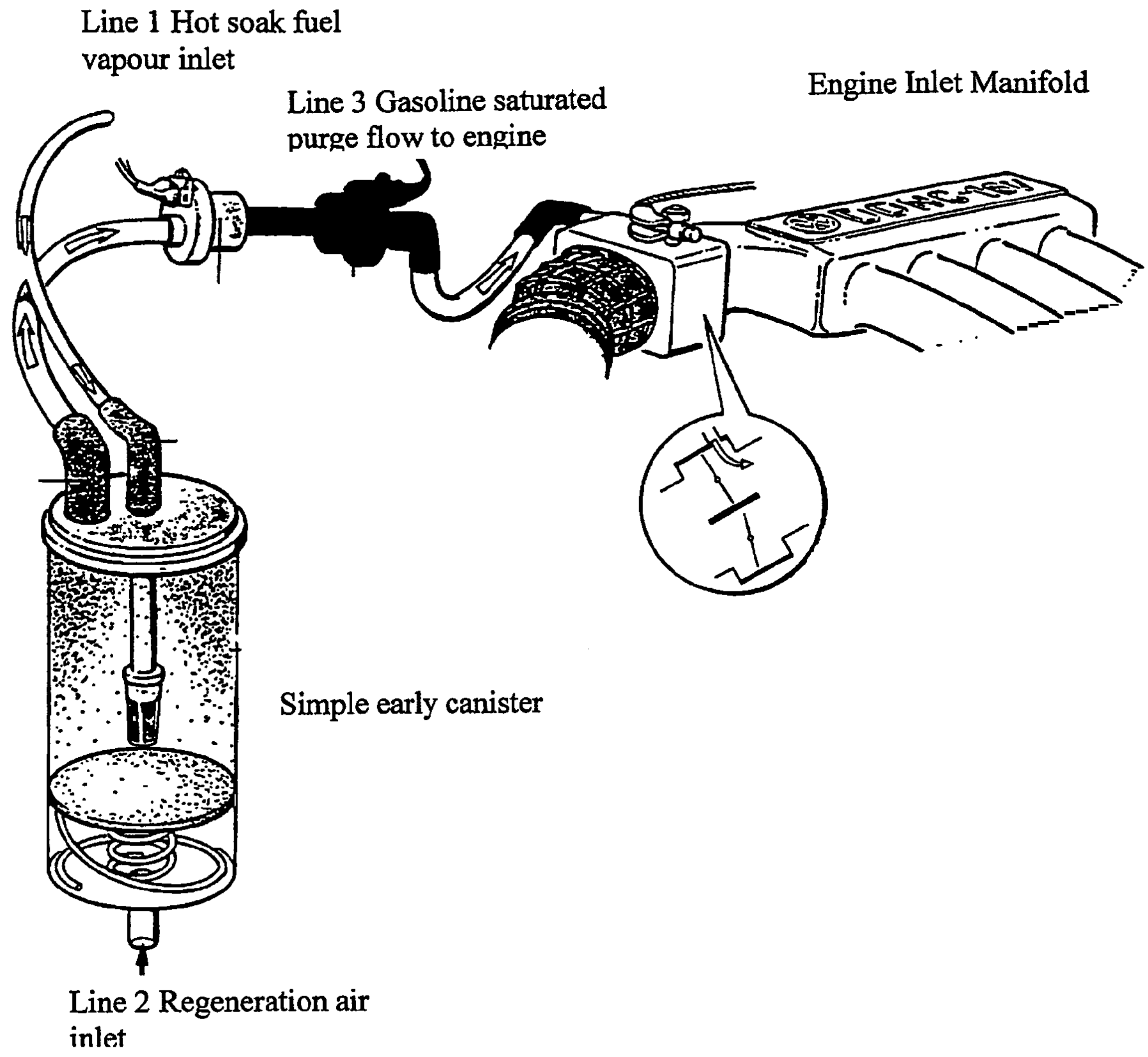
Fig. 2 Simple Hot Soak Loss Canister

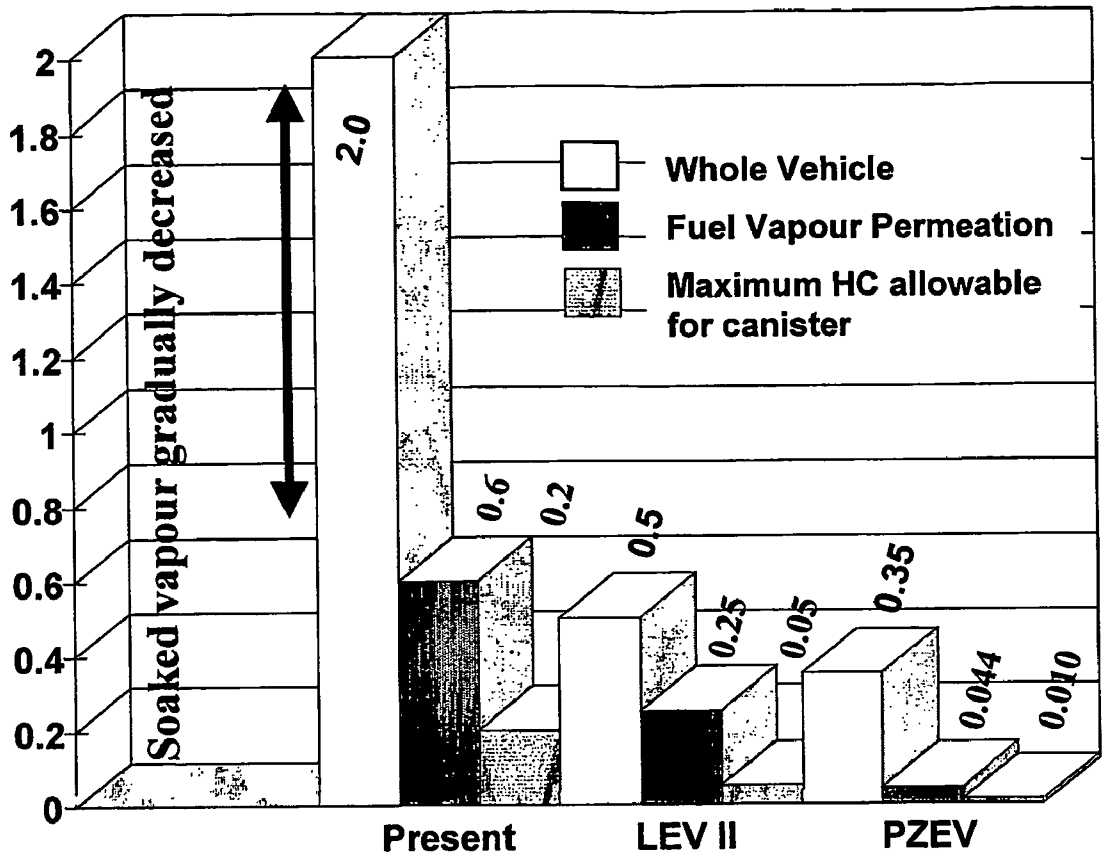
Fig. 3 Emission Control Targets

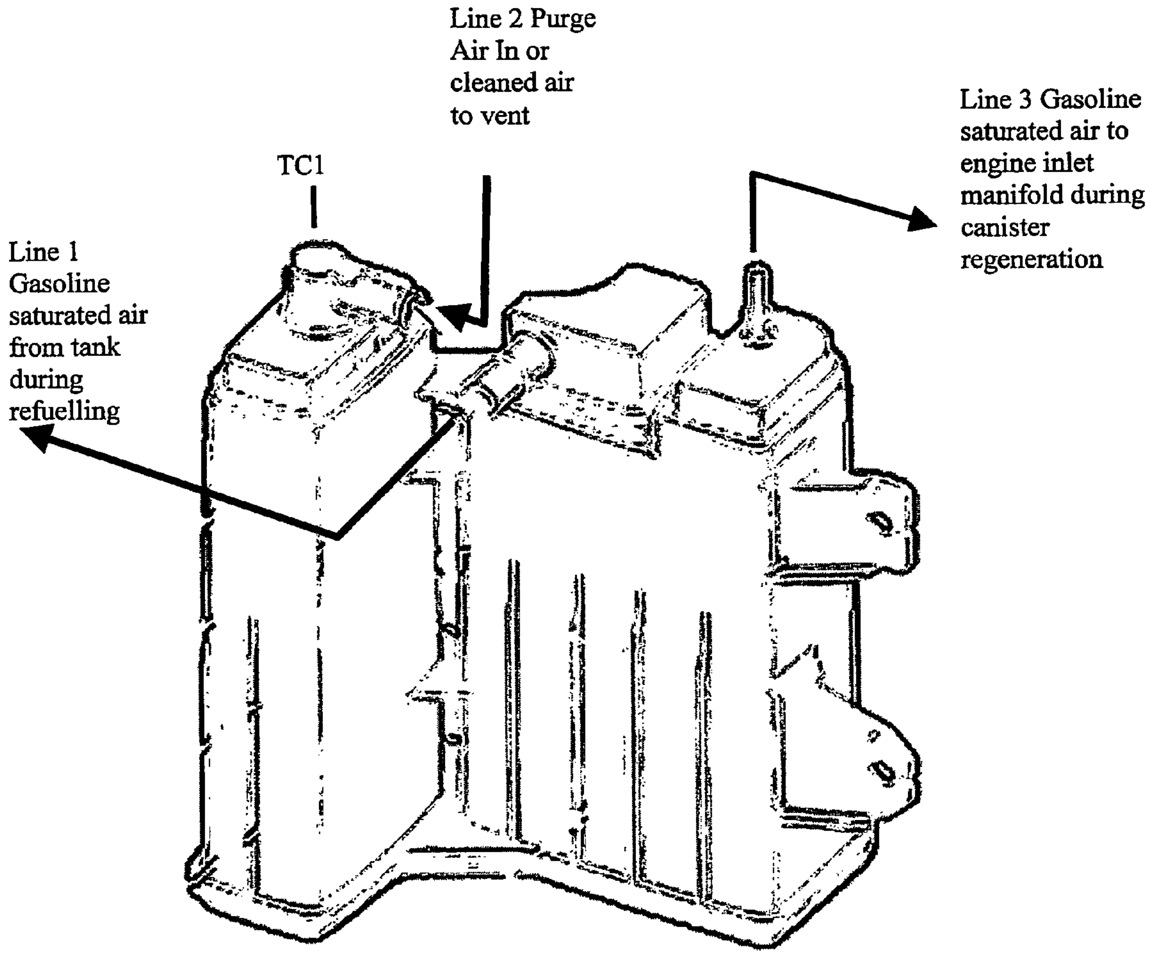
Figure 4 LEVII – Twin Chamber High Purge Flow Canister

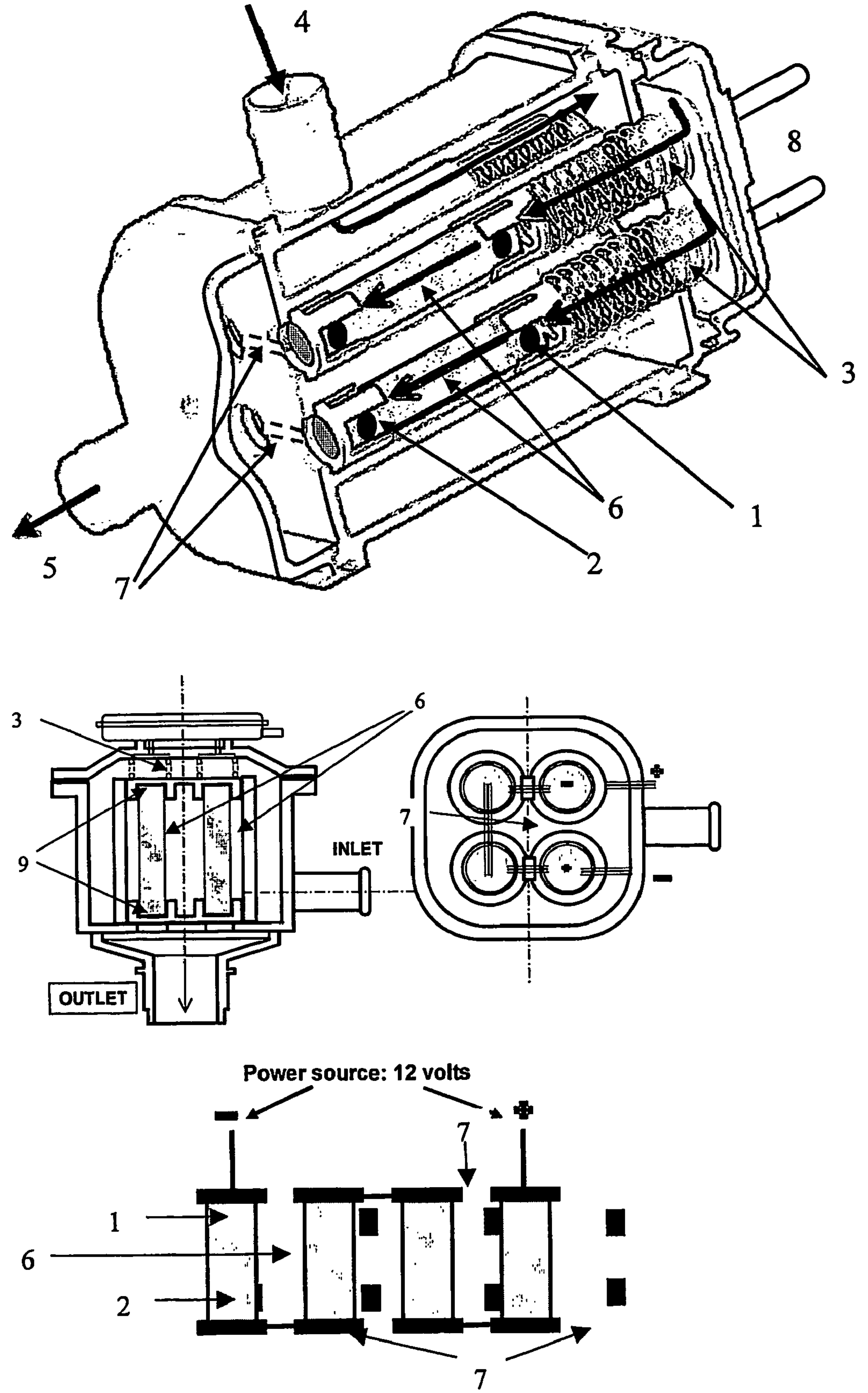
Figure 5 Heat Exchange Purge Heater Assembly

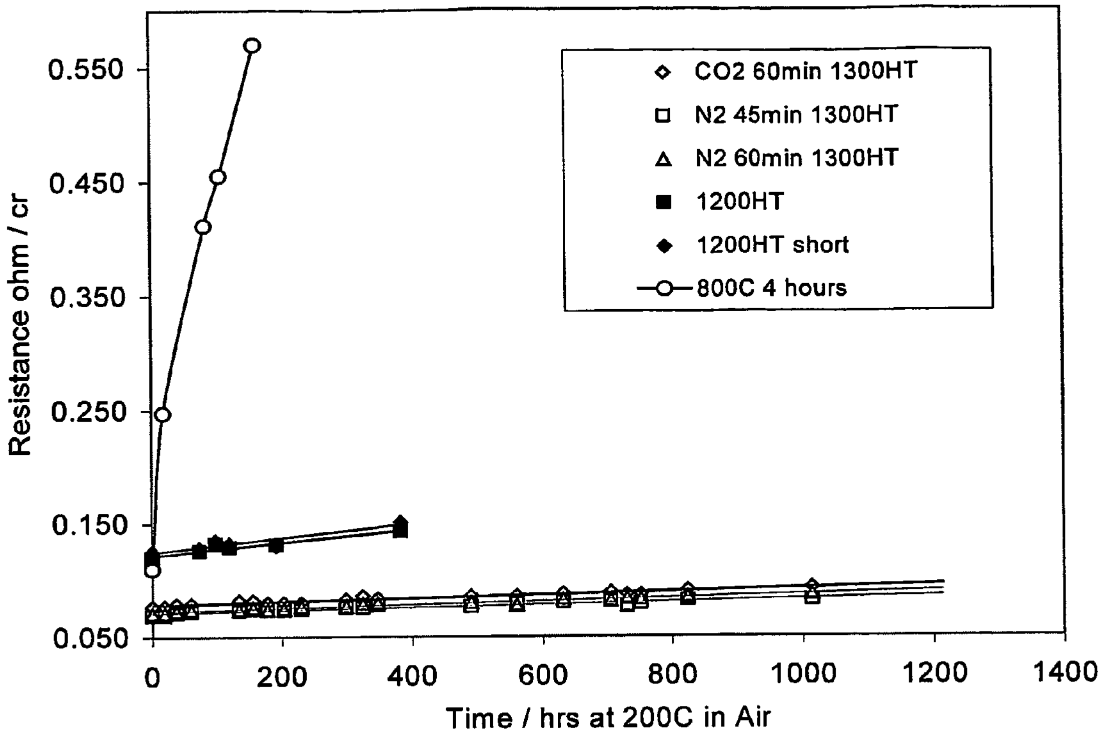
Fig. 6 Oxidative Stability of Thermally Treated Monoliths – Treatment at 200C in Air

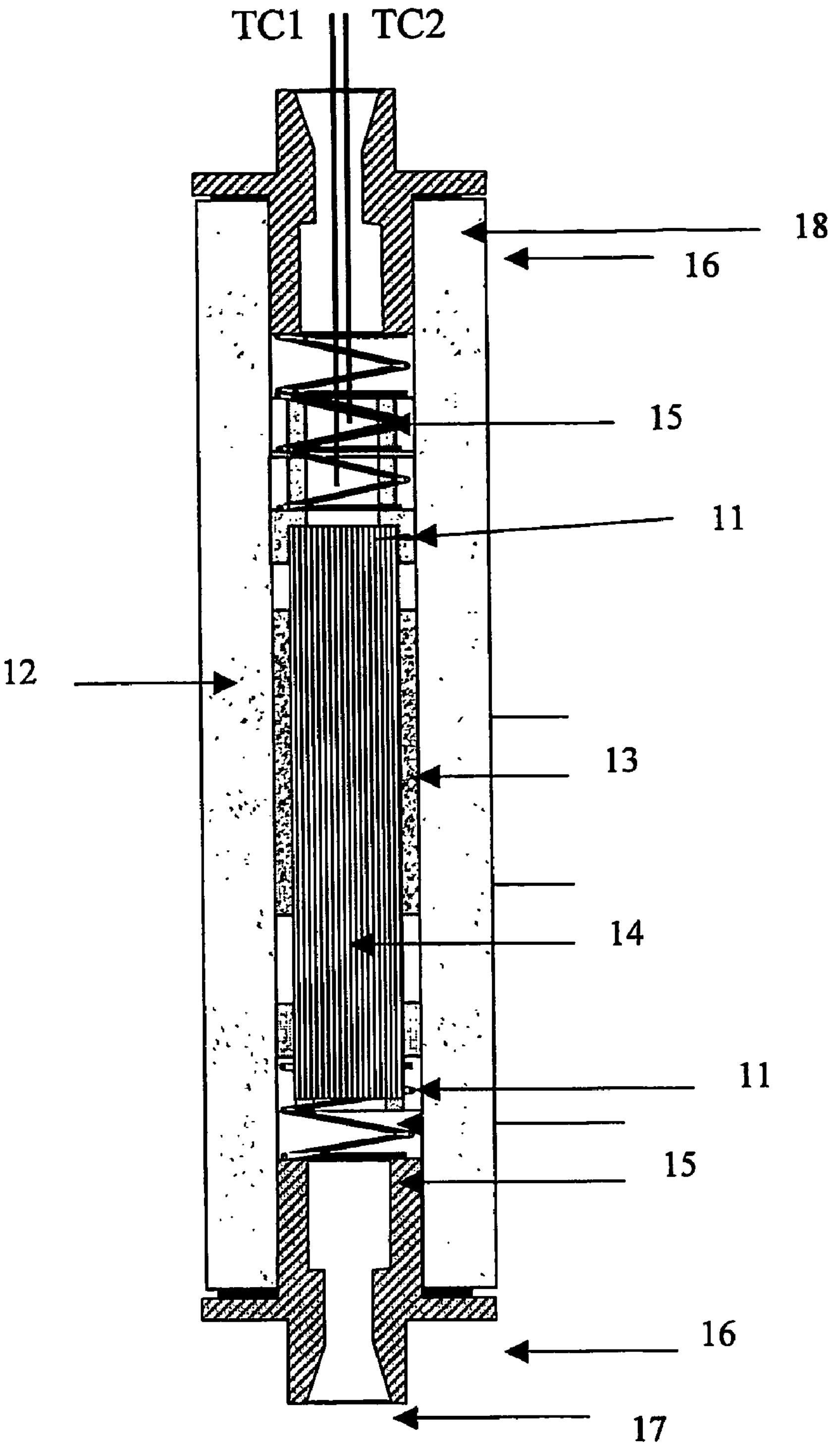
Figure 7 Resisto-jet Heater Test Device

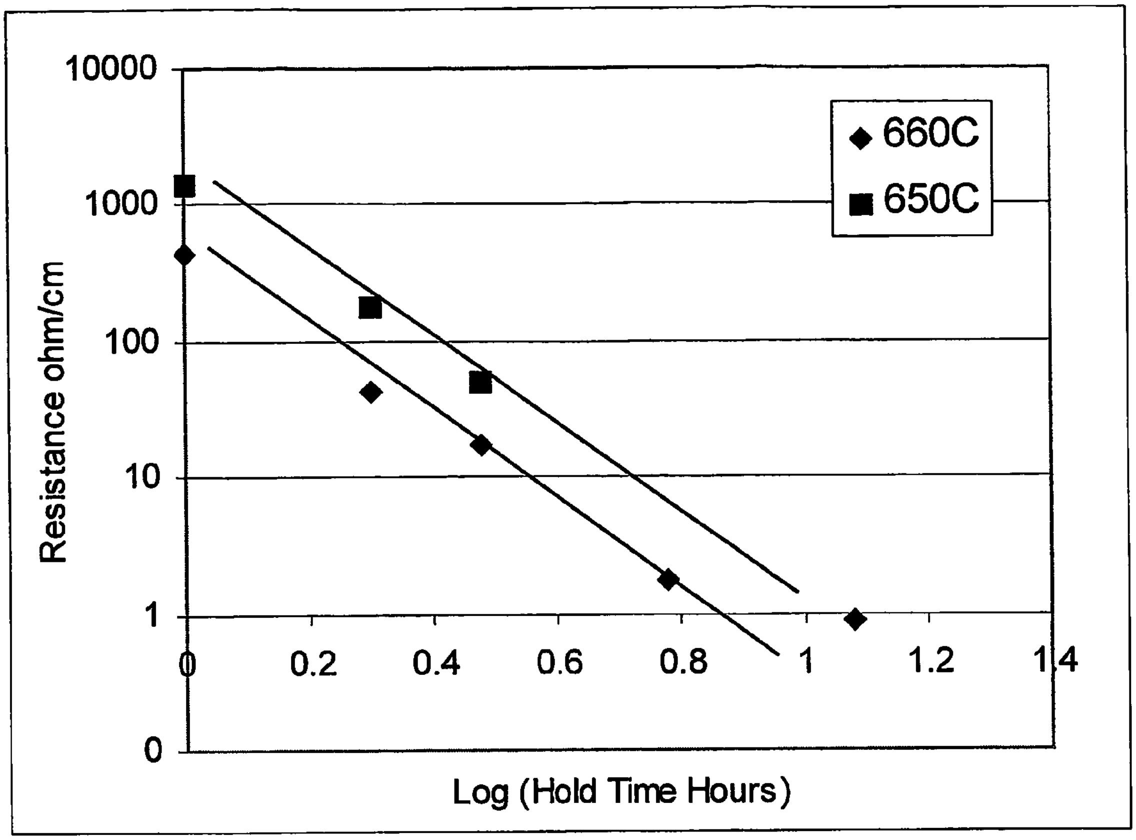
Fig. 8 Effect of Hold Time on Average Resistance

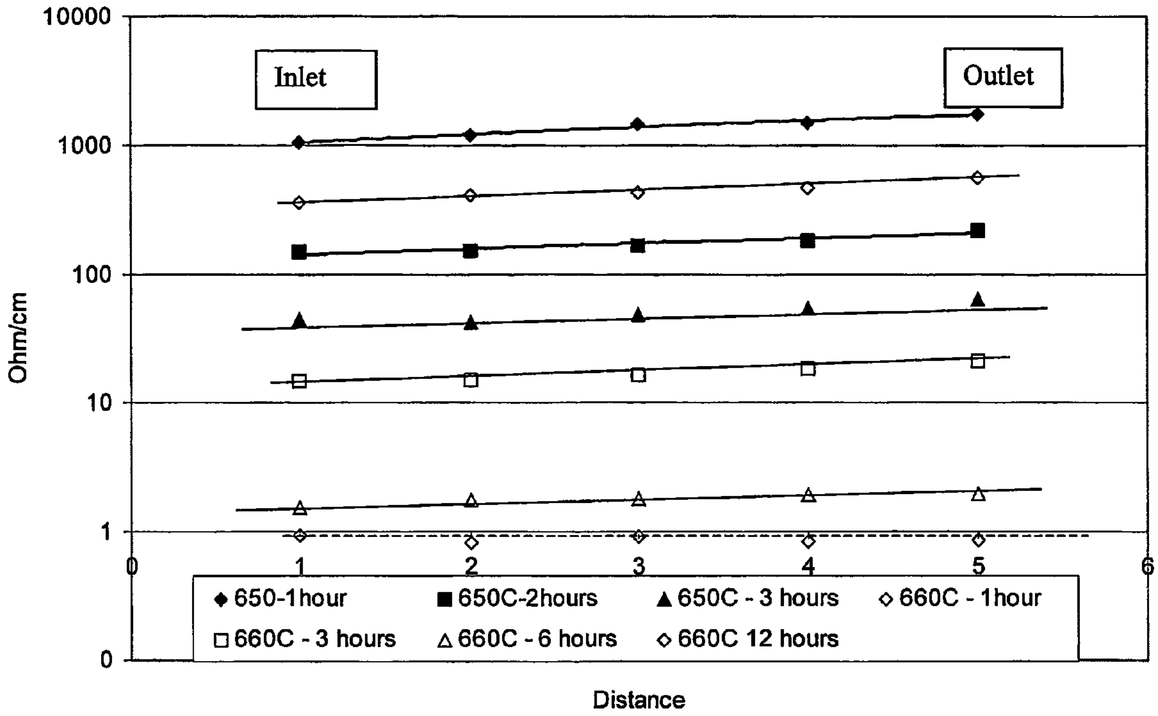
Fig. 9 Effect of Temperature and Hold Time on Resistance Gradient

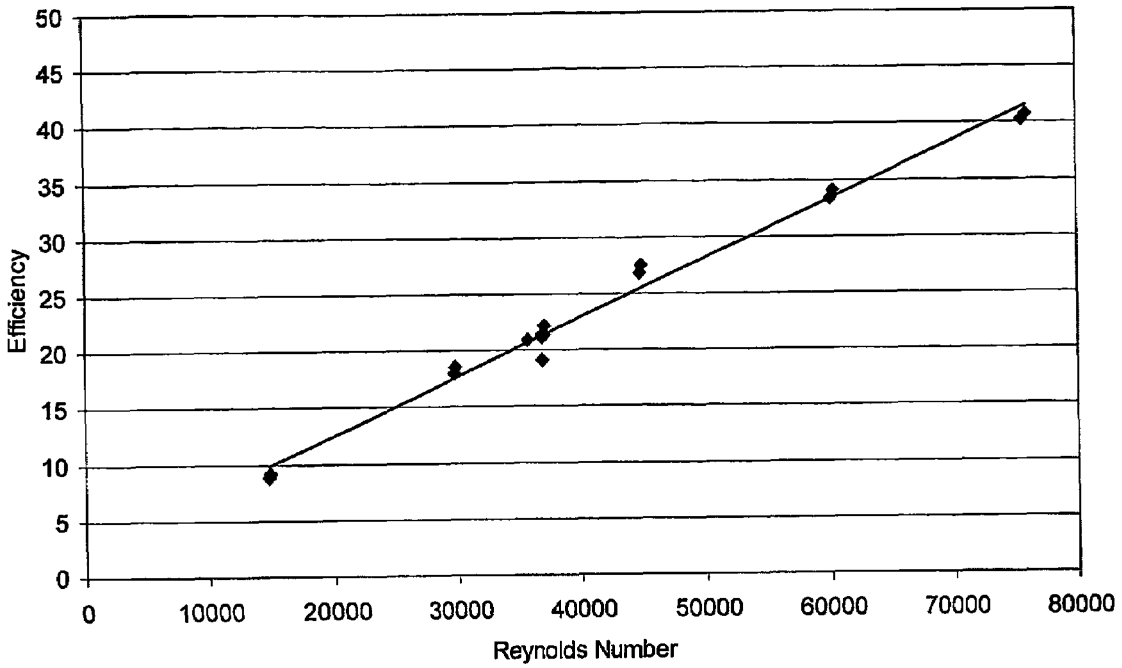
Fig. 10 Effect of Reynolds Number on Heating Efficiency for 3cm Monolith in Resistojet Application

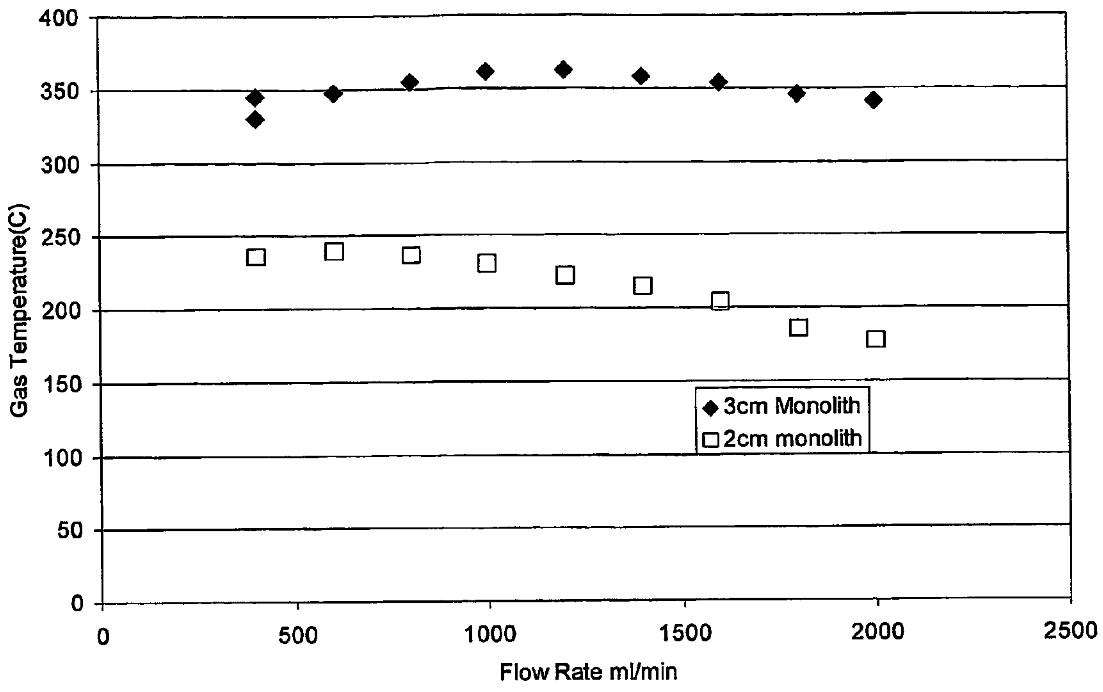
Fig. 11 Effect of Monolith length and flow on Gas Temperature in Resistojet Application

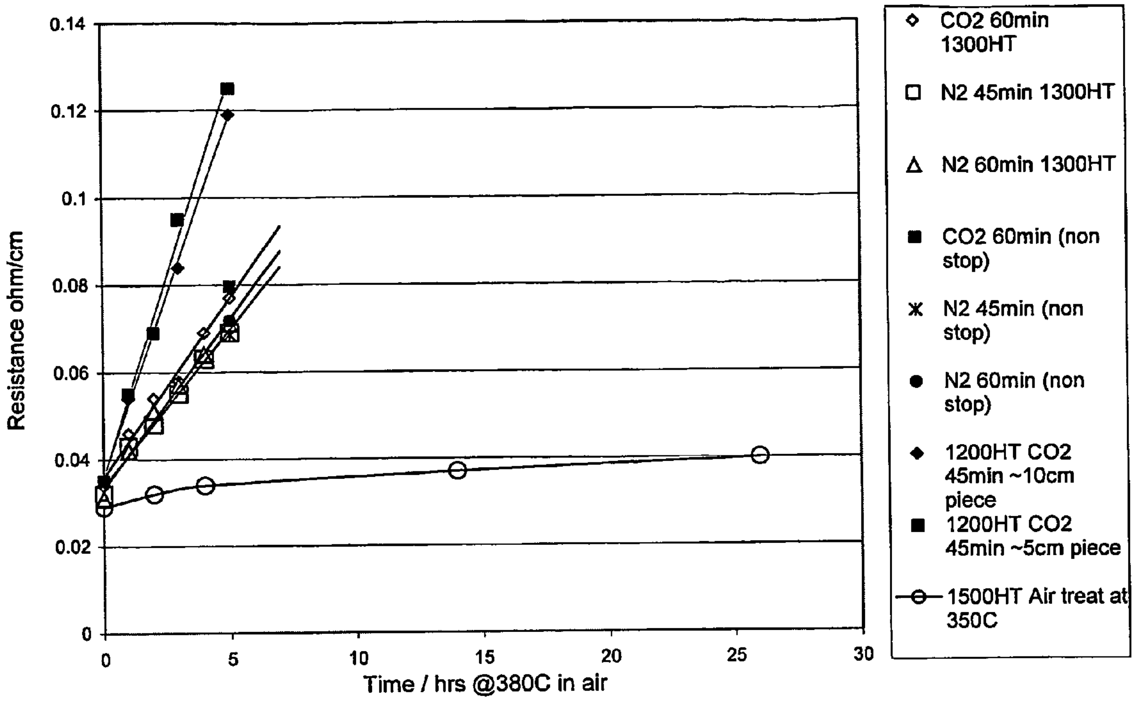
Fig. 12 Oxidative Resistance of Thermally Stabilised Monoliths in Air at 380C

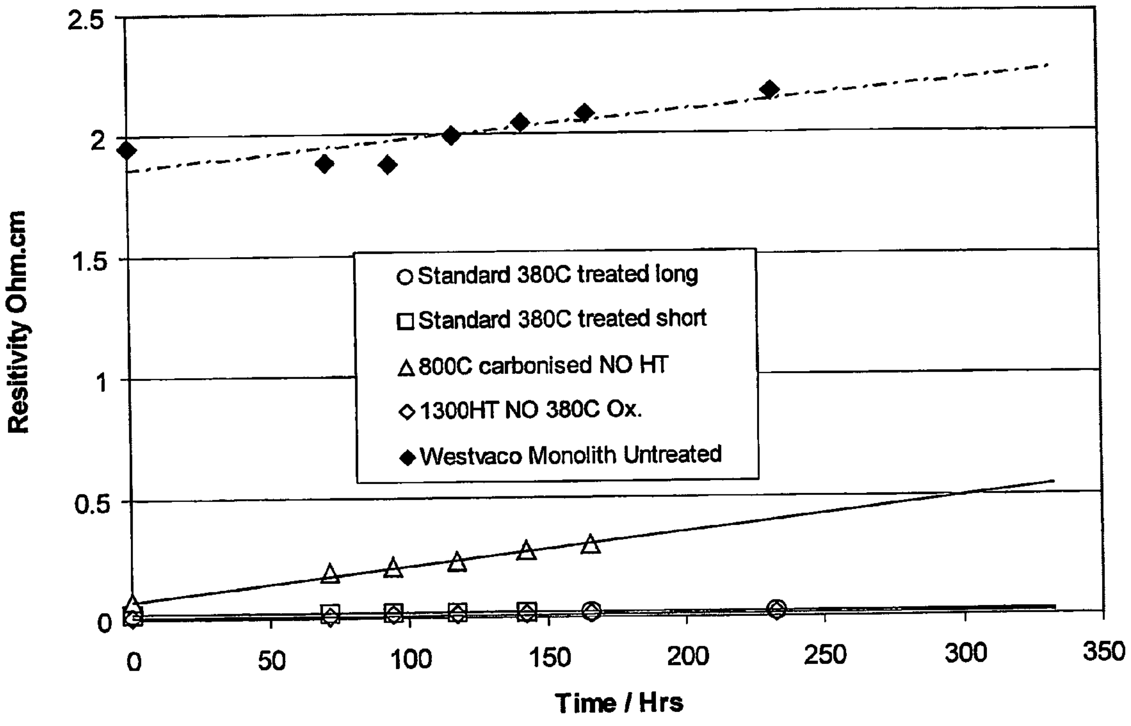
Figure 13 Comparison of the Oxidative Stability of Synthetic Carbon and Carbon-Ceramic Composite Monoliths after holding in Air at 200°C.

Figure 14 Purge Heater Adsorption Canister Tests

HEATER FOR FLUIDS COMPRISING AN ELECTRICALLY CONDUCTIVE POROUS MONOLITH

The present invention relates to a heater element and a heater incorporating the element and it particularly relates to a heater which can be used for heating fluids such as gases.

Conventional gas heating systems rely on the use of indirect heating via gas fired or electrically heated tubes, as in traditional heat exchangers, or via direct heating using electrical elements. However there are a large number of potential applications where gas heating is a critical requirement and where the known systems cannot be used and there is a need for an improved system.

The major disadvantage of these traditional systems when applied to smaller applications or to lower temperature process streams is their poor heating efficiency that then leads to high surface temperatures relative to the required process temperature. This leads to severe problems when the stream to be heated is thermally unstable and where the stream is combustible and high surface temperatures could lead to ignition or where the power availability is limited.

We have now devised a heating element and a heater which reduces these problems.

According to the invention there is provided a heater for fluids in which a fluid is passed over a heater element characterised in that the heater element comprises an electrically conductive porous monolith.

The invention also provides a heater comprising a container in which there is an electrically conductive porous monolithic heater element connectable to an electrical power source, the container having a fluid inlet and a fluid outlet in which fluid entering the container via the inlet passes over and through the heater element and then passes out through the outlet, the element being heated when an electric current is passed through the element.

A wide variety of materials can potentially be used to produce the monolithic elements provided only that they are electrically conducting, their resistance characteristics match those of the available power systems and their thermal and chemical stability is suitable for the desired application. The porous monolithic element is preferably a porous synthetic carbon monolith and its effectiveness is thought to derive from its unique combination of controlled resistivity and controlled structure. The preferred material is a synthetic porous carbon the structure of which is shown schematically in FIG. 1.

By "porous" is meant that the carbon has continuous channels through which liquid or vapours can pass combined with a micro-macroporous structure within the walls of the monolith.

By "monolith" and "monolithic" is meant that the porous carbon is in a single piece i.e. not granular. The monolithic carbon preferably contains large transport channels through which the gas can flow and by which means the pressure drop can be controlled. The channel structure is defined by the wall thickness, t, and the channel size, W.

Preferably the monoliths have a cell structure (cells per square inch—cpi) where the channel size, W, is between 100 and 2000 microns and the wall thickness, t, is between 100 and 2000 microns and with an open area of between 30 and 80% to give a good carbon packing density per unit volume and acceptable mass transfer characteristics.

In some applications it may be desirable that the monolithic heater also functions as an adsorber. In this case the monolith preferably has a surface area of at least 450 $m^2/g$, preferably in excess of 700 $m^2/g$. The surface area derives from the structure within the monolith walls which is both macro and micro porous. The macro porosity derives from the voids between the primary particles that make up the wall area that are comprised of primary particles with a mean size, $D_p$, of between 10 microns and 100 microns but where the maximum mean particle size is <10% of the wall thickness, W. The microporosity derives from the internal porosity of the primary particles that is generated by the voids between the micro-domains, $d_p$, created from the domains present in the original resin structure (FIG. 1).

The monoliths can be produced in lengths from around 1 mm to 200 cm but in the present invention this will depend on the use.

The monolithic porous carbon can be made by partially curing a phenolic resin to a solid, comminuting the partially cured resin, extruding the comminuted resin, sintering the extruded resin so as to produce a form-stable sintered product and activating the form-stable sintered product.

PCT/GB01/06082.1 gives details of methods of forming the porous carbons suitable for the porous carbon used in the present invention and its contents are included herein by reference. The process comprises (a) partially curing a phenolic resin to a solid, (b) grinding the solid to form particles, (c) forming the resulting ground product into a dough and extruding to a pre-determined shape at a pressure in the range 0 to 20 MPa, (d) sintering the shaped solid so as to produce a form-stable sintered product. The sintered product is then carbonised and activated.

After carbonisation these domains are microporous with an initial surface area of typically ~450 $m^2/g$ but that can be increased to >1000 $m^2/g$ by controlled activation.

Phenolic resins are well known materials. They are made by the reaction of a phenol and an aldehyde e.g. formaldehyde. The condensation is initially carried out to produce a partially condensed product. The condensation may be carried out so as to produce a resin which is fully curable on further heating. Alternatively the condensation may be carried out so as to produce a novolak resin which is only curable when an additional cross-linking agent is mixed with it e.g. hexamethylene tetramine (known as "hexamine" or "hex"). It is preferred to use hexamine-cured novolak resins in the process of the present invention.

The resin cure should be controlled so that it is sufficient to prevent the resin melting during subsequent carbonisation but low enough so that the resin particles produced during the milling step can sinter during subsequent processing. Preferably the temperature and duration of the partial curing step is selected as to give a degree of cure sufficient to give a sinterable product, and being such that a sample of the partially cured solid, when ground to produce particles in the size range 106-250 microns and tabletted in a tabletting machine, gives a pellet with a crush strength which is not less than 1 N/mm. Preferably the pellet after carbonisation has a crush strength of not less than 8 N/mm.

By "sintering" we mean a step which causes the individual particles of phenolic resin to adhere together without the need for a separately introduced binder, while retaining their individual identity to a substantial extent on heating to carbonisation temperatures. Thus the particles must not melt after forming so as to produce a molten mass of resin, as this would eliminate the internal open porosity of the article. The open porosity (as opposed to the closed cells found in certain types of polymer foams) is believed to be important in enabling formed articles to retain their shape on carbonisation.

In one embodiment the comminuted resin particles have a particle size of 1 to 250 microns. Preferably the resin powder size is between around 5 microns and 200 microns which provides for a macropore size of between 1 and 40 microns with a macropore volume of around 40%.

The milled powder can then be extruded to produce polymeric monolithic structures with a wide range of cell structures, limited only by the ability to produce the required extrusion die. Production of the monoliths is greatly facilitated by the extrusion of the cured resin powder rather than of a more abrasive ceramic or carbon powder. At this stage the monolith has a bimodal structure—the visible cell structure with open cells of around 100 to 2000 microns cell dimension and cell walls with thickness between around 100 and 2000 microns—and the macropore structure within the walls generated by the sintered resin particles.

The carbonisation steps take place preferably by heating above 600° C., e.g. 600° C. to 800° C. and typically 700° C. for the requisite time e.g. 1 to 48 hours but at a sufficient temperature so that an electrically conducting matrix is generated with the required resistivity properties. The process takes place under an inert atmosphere or vacuum to prevent oxidation of the carbon.

On carbonisation the material loses around 50% weight and shrinks by 50% volume but, provided the resin cure stage was correctly carried out, this shrinkage is accommodated with no distortion of the monolith matrix leading to a cell structure identical to that of the resin precursor but with dimensions reduced by approx 30%. The macropore size is also reduced by ~30% although the macropore volume (ml/ml) remains unaltered.

At this stage the microstructure of the porous carbon develops. After carbonisation the monolith behaves as a molecular sieve due to partial blocking of the microstructure by the decomposition products from the carbonisation process. These blockages must be removed to provide rapid access to the internal structure of the carbon that is essential for the operation of the monoliths as combined low pressure drop adsorbers and heaters.

After carbonisation the monolithic porous carbon can be activated to provide an enhanced pore volume and surface area. Activation can take place in either steam or carbon dioxide at temperatures above approximately 750° C. and 850° C. respectively or in combinations of these gases. The activation process is carried out for a time that varies with the temperature and the activation gas composition, such that a carbon weight loss of between 20 and 40% is achieved. Preferably the activation is carried in $CO_2$ at 850 to 1000° C. Such activation is not, however, a prerequisite for the heating devices of the current invention except where the device is required to function both as a heater and an adsorber. Activation will also lead to changes in the resistivity of the carbon as a function primarily of the temperature and time activation conditions.

The monolithic carbons are resistant to high temperatures and are biologically inert.

Patent application PCT/GB 2002/003259 discloses an improved method of forming complex carbon forms by sintering partially cured phenolic resin powders. In this route the novolak resin precursor is partially cured using hexamethylene tetramine (Hexamine) to an extent sufficient to just convert the thermoplastic novolak to a thermoset resin. The resin is then milled to a powder with a particle size of between 5 and 500 microns, mixed with an extrusion aid such as methyl cellulose to form a dough, and extruded to produce complex monolith structures which, after drying, can be carbonised and activated. The formed carbons have a very uniform structure, exhibit good thermal and electrical conductivity and can be produced with surface areas up to around 1000 $m^2$/g.

The synthetic porous carbon monoliths have a high heat transfer efficiency that derives from a combination of the very high heat exchange surface area that is attainable within small cell structures and the ability to directly heat all of this available surface by passing an electric current through the monolith.

Preferably the synthetic monoliths have a cell density, produced according to our co-pending applications referred to above, with cell densities up to 6000 cells per square inch. Table 1 below shows the available heat transfer surface area per unit volume as a function of cell density and cell geometry. We have also shown that the heat transfer efficiency of the monoliths is related to the Reynolds number of the gas stream within the monolith. The low pressure drop characteristics of the monoliths allows operation at high linear velocities without excessive pressure drop penalties so that the high Reynolds numbers can be achieved without requiring feed gas compression or through the use of vacuum to draw gas through the monoliths.

TABLE 1

| Cell | CPI resin | Pin size mm | Contact Area cm2/cm | fraction Open area |
|---|---|---|---|---|
| micro | 2687 | 0.4 | 19.8 | 0.673 |
| Small | 779 | 0.8 | 11.48 | 0.64 |
| medium | 585 | 0.9 | 9.7 | 0.621 |
| large | 364 | 1.2 | 8.06 | 0.601 |
| tube | | 6 | 2.2 | 0.857 |

cpi = cells per square inch

The carbon monoliths used in the present invention can be electrically heated in a highly controlled fashion. For many applications a key requirement in general is to be able to operate at low voltages that are matched to the system supply. This could be around 12 volts in vehicle applications and around 30 volts in satellite applications and military applications. These low voltages also provide for additional safety as the potential for arcing is minimized. With the monoliths useful in the present invention the resistance of the monolith can be matched to the required heat input, which is critical in many applications.

We have now found that the resistance of the synthetic carbon monoliths can be varied over a very wide range through precise control of the resin monolith carbonisation or pyrolysis temperature and that, surprisingly the residence time at the pyrolysis temperature also seriously impacts on the resistance. Carbon also possesses the well known but unique property that the resistance decreases as the temperature increases preventing runaway. We have now found that a further unique property of the carbon monoliths is that the temperature co-efficient of resistivity is also a strong function of the pyrolysis conditions where the temperature co-efficient increases as the resistance increases.

The invention also provides a method for controlling the electrical resistance of a porous synthetic carbon monolith which method comprises (a) partially curing a phenolic resin to a solid, (b) grinding the solid to form particles, (c) forming the resulting ground product into a dough and extruding to a pre-determined shape at a pressure in the range 0 to 20 MPa, (d) sintering the shaped solid so as to produce a form-stable sintered resin product and (e) pyrolysing the form stable porous resin product to produce a carbon monolith in which the electrical resistivity of the monoliths is controlled by varying the pyrolysis temperature and the residence time at the pyrolysis temperature.

The resistivity is dependent on the duration and temperature of the pyrolysis step and resistivities from around 700 ohm.cm to less than 1 ohm.cm can be achieved at pyrolysis temperatures between 600 and 800° C. respectively. This resistivity can be further reduced to less than 0.1 ohm.cm by increasing the pyrolysis temperature to >2000° C.

The resistivity of the carbon can also be increased in a controlled fashion by introducing surface oxygen. This can be achieved by holding the carbon materials in air at temperatures from 100 to 500° C., preferably between 150 and 400° C., for varying times or by chemical activation methods including but not limited to treatment with nitric acid, hydrogen peroxide, sodium hypochlorite or any other known oxidizing agent.

We have also found that where it is desired to use the heater device in an air stream it is important that the monoliths are stabilised by high temperature thermal treatment.

If the synthetic carbon monoliths pyrolysed at temperatures below 1300° C. are used in air at temperatures up to 200° C. the resistance changes dramatically during use and this can cause premature failure due to local over heating. This can be avoided by heat treating a monolith initially pyrolysed at 800° C. to at least 1300° C. The stability increases with the heat treatment temperature but for operation at 200° C., treatment at 1300° C. is sufficient. A drawback to this is that the resistance is decreased significantly and may then be too low to match the operating voltage and current requirements. Under these circumstances the resistance can then be increased by controlled high severity air oxidation. The ability to carry out this modification decreases as the heat treatment temperatures increase such that by 1500° C. it is difficult to increase the resistance. The optimum treatment temperature is in the range 1300-1400° C. which provides a good balance of stability in air operation with the ability to increase the resistance. The slight air activation used in this process has the further benefit of reintroducing a significant surface area if the heater is also to be used as an adsorption device.

The combination of these flow and resistivity characteristics then provides a unique operating characteristic of these monolith heaters where, when heating a gas, the produced gas temperature is relatively insensitive to the gas flow over quite a wide volumetric flow range (see FIG. 11). This arises primarily from the significant increase in heat exchange efficiency with gas linear velocity.

Other materials that can also be used as the porous monolithic heater element in the monolithic heaters and are incorporated here by reference are:

1. Carbon-ceramic composite monoliths produced according to U.S. Pat. No. 6,284,705 where the activated carbon powder and the ceramic binder are co-extruded. By virtue of the high ceramic loading of these materials they tend to have a significantly higher electrical resistivity than the carbon monoliths which will restrict their use to applications where higher voltages are available. It would also be difficult to heat treat these monoliths to provide enhanced operational stability when using air as the fluid as the ceramic component could not resist the temperatures required. It is however possible that lower resistivity carbon/ceramic monoliths and monoliths with the necessary oxidative stability could be produced using the method described in U.S. Pat. No. 6,284,705 but using graphite powder in place of the activated carbon powder.

2. Ceramic carbon composite structures produced according to EU patent 0684071 A2 where a ceramic monolith is impregnated with a resin that is then pyrolysed to produce a carbon coating on the ceramic substrate. The resistance of the carbon ceramic composite can be varied by adjusting the carbon content of the finished composite. The carbon content is typically less than and up to 50% weight of the finished composite. The resistivity of these composites varied between 1.25 ohm.cm and 7 ohm.cm for carbon loadings between 8.9% and 18% weight. This will limit their use in some heater applications whilst the presence of the ceramic will also prevent the high temperature stabilisation required for the air applications.

3. Metal monolithic structures produced for instance by rolling corrugated metal sheets as described in patent U.S. Pat. No. 5,187,142. In contrast to the high resistivity of the carbon-ceramic composites these materials will tend to have a very low resistivity that will only be applicable in high current—low voltage applications, although the resistance can be adjusted by careful selection of the metal used. U.S. Pat. No. 6,572,682 describes a sintered metal filter that can be directly electrically heated but this is for the purpose of oxidizing carbon particles trapped in the matrix rather than for heating the gas flowing through the filter.

4. Silicon carbide monoliths as produced by U.S. Pat. No. 6,582,796 or by the route described in our co-pending application PCT/GB99/01749. As in the carbon-ceramic monoliths these will be characterised by a high resistance only allowing them to be used in higher voltage applications. Such monoliths, along with the metal monoliths, have the additional benefit of being operable in oxidizing atmospheres and any other electrically conducting porous monolith materials with the required resistivity and gas flow characteristics.

These heat exchange properties can be applied in a wide variety of end uses covering a wide range of scales some of which are described below, and illustrated in the drawings.

In the drawings:

FIG. 2 shows a simple early canister system;

FIG. 3 shows the evolution of the legislation controlling emissions;

FIG. 4 shows a two chamber LEVII canister;

FIG. 5 shows a purge heater design;

FIGS. 6 and 8-14 show performance tables referred to in the examples and FIG. 7 shows a test device.

VEHICLE EVAPORATIVE CONTROL

Figure 1:
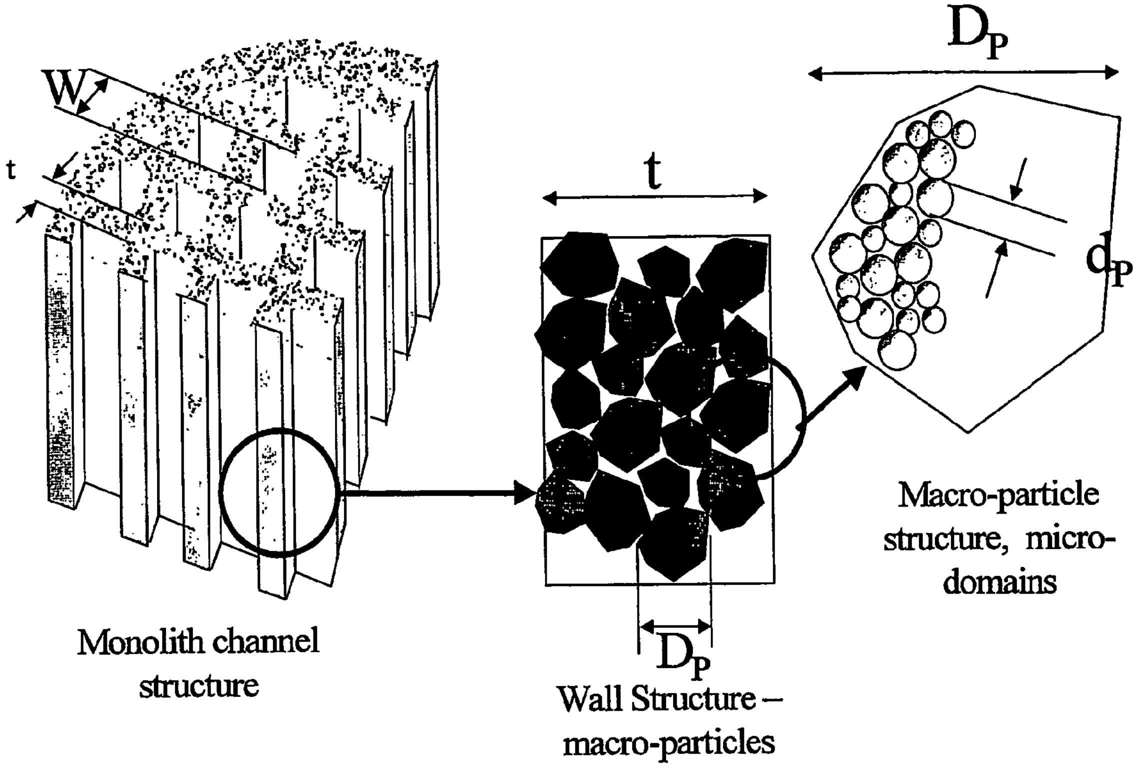
FIG. 1 shows the dimensions in porous carbon monolith.

A major potential use is in vehicle evaporative emission control. Carbon canisters have been used for some time now in all gasoline engined vehicles to eliminate hot soak losses. These losses are due to gasoline vapours released from the fuel tank and the hot engine when the vehicle is stationary. The simple early canister system is shown in FIG. 2. When the vehicle is stationary the emitted vapours are passed to and adsorbed in the canister through line 1. When the vehicle is in use air is drawn through line 2, via the canister and line 3 to engine inlet manifold where they are combusted with the fuel. The small canisters, containing typically around 500 ml of activated carbon, demonstrated the problems with the use of activated carbons in this application. Whilst activated carbons are ideally suited to the adsorption of gasoline vapours the critical problem is regeneration of the canister. Regeneration is only achieved by drawing cold, clean air through the canister when the vehicle is operational. This is in marked contrast to industrial carbon systems where the canister temperature is raised to perhaps 200° C. to drive off the adsorbed vapours. This places major constraints on the carbon to be used in the vehicle emission canisters. The majority of activated carbons are highly microporous (pores of less than 2 nanometres diameter) and these very small pores then give rise to the large surface area (in excess of 1000 $m^2/gm$) that is responsible for the high adsorption capacity of the carbons (in excess of 50% wt for aromatics). However these small pores also give rise to very high heats of adsorption that then makes cold gas regeneration very difficult. The critical parameter in these canister carbons is the "working capacity" which is a measure of the hydrocarbon adsorption capacity after several adsorption-desorption cycles using the cold gas desorption process. The effect of this is that, even for a more weakly adsorbing hydrocarbon such as butane, the working capacity in a microporous carbon is only perhaps 6% weight, compared to a first cycle capacity of perhaps 50% weight, which then defines the canister size.

These early, simple, carbon canisters have now been replaced by more complex systems as the legislation covering vehicle emissions becomes tighter. The evolution of the legislation is shown in FIG. 3. In addition to the requirement to eliminate hot soak emissions they are also now required to deal with refuelling emissions (ORVR). In this case the vapour load corresponds to the volume of the fuel tank, saturated with vapour, and is displaced through the canister in the time taken to refuel the vehicle (approximately 60 litres (~150 g) in 2 minutes). This, combined with the substantial reduction in permitted fuel vapour emission, has led to the more complex chamber two chamber LEVII canisters shown in FIG. 4. This has only been achieved through the use of more mesoporous carbons, but even with the increased working capacity of these carbons (~10%), this leads to a substantial increase in canister volume (2-3 L of carbon). Impending legislation will require that stationary emissions are even further reduced in the near future (PZEV) as shown in FIG. 3 and this will require even more complex, multi-chamber canisters. This is further complicated by the transition to lower purge volume availability with future generation engines. At present with 300 L purge LEV2 can be achieved through two chamber designs incorporating special carbons whilst PZEV can only be achieved through multiple chamber designs or the use of expensive monolithic carbons as exit gas traps. There is no practical way at this moment of achieving the PZEV standards with the lower purge volumes (120BV) that will be available in future generation direct injection engines.

One option is to enhance the performance of the existing, canister designs by more effective hot gas regeneration. The constraints on purge gas heaters for the canister application are complex and derive from:

1) the available purge flow (2-10 l/min) and the time cycle for regeneration (~30 minutes), currently around 300 L but decreasing to 120 L;
2) the carbon temperature required in the canister (minimum 80° C.);
3) the maximum surface temperature in the heat exchanger which, for safety reasons, should not exceed 200° C. in the presence of air/gasoline mixtures.

We have now found that both the LEV2 and PZEV requirements can be potentially achieved using a purge gas heater based on the monolithic gas heaters of the current invention. One example of a purge heater design is illustrated in FIG. 5. In this design the monolith structure is controlled by a combination of the required resistivity during regeneration and the allowable pressure drop during refuelling. During purging the flow through the monoliths is between approximately 2 and 20 litres/minute depending on vehicle operation (high flow during idling and low flow with the engine at maximum output), whilst during refuelling this can rise to 50 L/minute during which the pressure drop through the complete canister-purge heater assembly should not exceed 100 Pa. The number of monoliths is controlled primarily by the allowable pressure drop and the resistance required to generate the desired power. The primary variable in the heat generation is the power consumption (watts) which at the vehicle voltage (12V) is then controlled by the monolith resistance. We have found that to heat 5 L/minute gas from 25° C. to 150° C., the temperature required to heat the granular bed to 80° C. in the target regeneration time, a power input of approximately 30W is required that is readily available from the battery or the alternator. This corresponds to approximately 2.5A and to a combined resistance in the heater device of approximately 5 ohms. The low pressure drop requires a large monolith cross section and short monolith length whilst the resistance requires a smaller cross section and longer length. These conflicting requirements have led to the design shown in FIG. 5 where four 10 mm diameter monoliths are used in parallel to provide the required cross section but are electrically connected in series to provide the necessary resistance. The resistivity of these monoliths is ~0.19 ohm.cm (allowing for the open area of the monolith). The number of monoliths can be chosen to meet the design constraints but it is preferred that an even number of monoliths are used so that all electrical connections are made at one end of the heater assembly whilst the minimum number, consistent with the design constraints, should be used to minimise contact resistances and assembly cost. The preferred number is 2 or 4. Monoliths with a lower resistivity, or lower total resistance, can also be used if a power control device is used to prevent excessive current drain. However the resistivity should not be so low that the contact resistances within the device comprise a significant part of the overall system resistance. Preferably the total monolith resistance should be more than 50% of the overall device resistance. The maximum resistivity than can be tolerated is fixed by the power requirements. Two monoliths, 1.5 cm in diameter, would require a resistivity of 0.85 ohm.cm whilst a single monolith would need to be 2 cm in diameter, with the same open area as the existing monoliths (65%) to give the required pressure drop, with a resistance of approximately 4 ohm, equivalent to a resistivity of approximately 2.5 ohm.cm. However in this case considerably more care would need to be taken to achieve an even power distribution across the monolith. This resistance could be achieved using a 30 mm diameter ceramic-carbon composite monolith, as described in U.S. Pat. No. 5,914, 294.

One embodiment of the device that uses 4 monoliths is shown in FIG. 5. The four monoliths (6) are held at each end in copper connectors (9). These are interconnected by copper connectors (7) to achieve the series electrical connections. The monolith and copper connector assemblies are held inside the purge heater body by springs (3), two of which also provide the electrical connection to the external power connectors (8). Gas flow through the body is through the entry port (4), over the external surface of the monolith housings, passing through the monoliths and exiting via the outlet port (5). This prevents the external surface of the heater from getting too hot and helps to minimise heat losses. In the results discussed in the examples this purge heater was instrumented by fixing temperature probes to the monolith surfaces at the inlet (1) and outlet (2).

However, we have found that the carbon monoliths prepared by pyrolysis at 800° C., or the ceramic carbon-composites prepared according to U.S. Pat. No. 5,914,294 which meet the resistance targets defined above, have insufficient stability for long term use when air is being used as the purge medium, as is essential in the purge heater application. A typical purge heater application requires an exit gas temperature from the purge heater of around 130° C. at flows of up to 30 L/minute that corresponds to a monolith exit temperature of approximately 170° C. Higher temperatures would be beneficial but would lead to a significant increase in material costs for the heater and canister body that should preferably be capable of production by injection moulding.

This has been evaluated using an accelerated ageing test in which the monoliths are held in air at 200° C. for extended periods, equivalent to approximately 8 times longer at the proposed 170° C. operating temperature. As shown in FIG. 6, at a temperature of 200° C., in the presence of air, the resistance of a synthetic carbon monolith prepared by pyrolysis at 800° C., showed poor stability. The resistance increased from approximately 0.1 ohm/cm to 0.57 ohm/cm after only 200 hours at 200° C. This can then lead to local overheating as the resistance increases most rapidly in the highest temperature region, further concentrating the power usage in that region. Ultimately the monolith would undergo deep oxidation and would then fail completely. We have found, however, that if the monolith is thermally treated at 1300° C. it can be used for extended periods at 170° C. with only very small changes in resistivity. Heat treatment at 1300° C. has the further benefit that the resistance can be increased by controlled air oxidation that also increases the available surface area. At 1200° C. the monolith is less stable whilst at 1500° C. the monolith is very stable but increasing the resistance and the surface area by controlled oxidation becomes progressively more difficult.

The air stability of the carbon-ceramic monolith of U.S. Pat. No. 5,914,294 is shown in FIG. 13 compared to the synthetic carbon monoliths. It can be seen that the ceramic carbon composite has a much higher resistivity and demonstrates a significant air instability although this is less than shown by the synthetic carbon monolith prepared at 800° C. This improved stability (30% increase in 200 hours) can be attributed to the higher preparation temperature of the carbon ceramic monolith, claimed in U.S. Pat. No. 5,914,294 to be in excess of 1000° C. This can be compared with the thermally stabilised synthetic carbon monoliths in FIG. 6 where the monoliths treated at 1300° C. demonstrated very little change in resistance after 1200 hours in air at 200° C. The level of stability demonstrated is unlikely to be sufficient for long term operation at the target heater temperature of 170° C. but could be usable at a lower heater temperature.

Using the 1300° C./air modified synthetic carbon monoliths in a 4 monolith device as shown in FIG. 5, (total resistance ~1.3 ohm), combined with a micro-control power system using a thermistor attached to the monolith outlet, we have shown that it is possible to produce an air stream temperature at the purge heater exit of 150° C. with flows that vary between 2 and 30 L/minute using input power that varies between 15 and 60W from a 12V supply. Using the thermistor based control system the heater responds rapidly to changes of purge air flow rate and fails safe, with the power cutting off instantly if the purge air flow is stopped. In an adsorption/regeneration test cycle the first zone in the canister then reached 90° C. with a progressive reduction though the canister. This gave approximately a 20% increase in pentane working capacity in an unoptimised standard LEV2 canister compared to simple cold gas regeneration with further benefits in bleed emissions.

Micro Satellite Propulsion Systems

There is a current move away from very large and expensive satellite systems to small or micro systems that might only weigh a few kilograms. For these satellites the propulsion devices are used for: (a) Orbit injection correction; (b) Phasing of each satellite with the others in a cluster and (c) Drag mitigation, At present such propulsion systems tend to use only cold gas expansion from a pressurised or liquid gas reservoir, which severely limits the propulsion energy available and therefore the life of the fuel reservoir. Designs have been developed to use electrically heated hot gas thruster systems but existing concepts have several major problems: (i) Current low power resisto-jets for small satellites require significant energy input (~10 minutes of heating at 15W) to raise the thruster casing to ~300° C. before propellant flow and a maneuver can be initiated. Use of the propulsion system therefore prevents other power processes on the satellite taking place during this heating phase; (ii) an entire orbit is typically dedicated to a propulsive maneuver. Although maneuvers are expected only every month, a reduced time for imaging or data downlinking occurs when propulsion is required, lowering the utility of the satellite; (iii) due to the limited thermal transfer efficiency of current resisto-jet heater systems (nichrome heating elements spiral wound inside a steel chamber), a maximum of only 2 minutes firing can be guaranteed before the propellant cools the chamber and allows ingress of liquid propellant. Gaseous propellant is preferred as this allows a higher specific impulse, and thus longer satellite lifetime; (iv) small satellites also have applications in geostationary orbit and in interplanetary space. Beyond low Earth orbit, stabilisation by reaction wheels and magnetorquers is inefficient due to low or zero magnetic field. Conventional thruster systems using, e.g. hydrazine monopropellants are preferred for attitude control and orbit correction. However the cost of designing a system to use hydrazine, and the associated costs partially negate the cost-effectiveness of small satellites. A green propellant based small satellite propulsion system with an activation time comparable to a hydrazine system (in the millisecond range), and potentially useable for attitude control would enable a highly marketable, low cost maneuvering and attitude control capability and (v) future small satellite missions are likely to make extensive use of xenon propellant, because of its gaseous nature (no slosh effects) and high storage density. However xenon is a low performance propellant, offering an Isp of around 50 s compared to 90 s for butane in the same low power resisto-jet. To maximise the performance of xenon, the thruster must be run at the highest temperature possible. Thruster Isp is approximately proportional to temperature, so as to achieve a similar performance to butane it will require operation in excess of 1000° C. This is beyond the capability of the current design and is not feasible with butane which thermally cracks to give carbon (clogging the thruster) above ~450° C.

We have now shown that the monolith systems based on the materials of the invention are capable of heating the required gas flows (~2 L/minute) to temperatures in excess of 400° C. using the power available on small satellites (approx 30W) with very high efficiency and over short time cycles and of maintaining the temperature for extended periods. This eliminates both the time required for heat-up (~1 orbit for conventional systems) and the short firing time accessible with current heated wire systems. The monoliths have the additional benefit of showing essentially zero pressure drop, allowing the full pressure drop to be developed across the thruster exit nozzle for maximum thrust efficiency.

One embodiment of this device is shown in the test device used to evaluate the application in FIG. 7 and comprises the carbon monolith (14) mounted in a high temperature ceramic body (12) with ceramic paper insulant (13) to prevent gas bypassing the monolith. The monolith is held between copper connectors (11) that are connected to the gas inlet (17) and outlet (18) via springs (15). The gas inlet and outlets are sealed to the ceramic body by washers (16) to allow the device to operate at pressure.

Analyzer Systems

One method for analysis of trace amounts of organics is to concentrate the material into activated carbon and then to thermally desorb the adsorbate into the analyser. The effectiveness of such systems is limited by the rate at which the carbon can be heated and the temperature to which it can be heated. In the case of granular carbons this is limited by the heat transfer ability of the granular bed which actually functions as a good insulator. With the current invention the monoliths can be heated to temperatures in excess of 1000° C. in a few seconds using very low power allowing even high molecular adsorbates to be rapidly desorbed. The structure of the monolith allows this to be removed from a sampling environment and loaded into the analyser containing the electrical heating supplies or for a complete system to be connected to the analyser. The power required for such a system would be around 50 W for temperatures in excess of 1000° C. but depends on the purge gas flow required.

Controlled Humidity Systems

There are many environments where there is a requirement to maintain the humidity below a fixed level. One application could be for instance in boats where, during periods of non-use, the humidity in the cabin reaches 100% causing significant problems. This could be overcome by raising the air temperature to around 25° C. Whilst this could be achieved with more conventional air heaters, unmanned operation means that combustion systems cannot be used, whilst the power consumption of conventional electrical heaters would be too high for the available power supplies and the presence of very hot surfaces would be undesirable. The monolithic heaters of the current invention only consume a small amount of power to produce air at 30° C., whilst the lower pressure drop means that only fans, rather than compressors, are required to produce the required gas flow. This would allow the device to be driven from batteries that could be recharged using solar or wind power. Such systems can also be applied for instance to electronics cabinets where a low relative humidity is required. This would be achieved by holding the temperature at 40° C., for instance using a recycled gas heater.

EXAMPLE 1

Production of Controlled Resistance Monoliths by Controlled Pyrolysis and Oxidation Stainless steel trays 30 cm square and 5 cm deep were filled with a powder comprising a standard commercial Novolak, supplied by Borden Chemicals with a code number of J1011S. The trays were then placed on a trolley inside a curing oven and the cure was carried out by raising the temperature to 100° C. over a period of 1.5 hours, holding at 100° C. for 1 hour, raising the temperature to 150° C. over a further 1 hour and holding at 150° C. for 1 hour. The cured block was then hammer milled to give a coarse powder of greater than 90 microns particle size. The hammer milled powder was then jet milled using a Hozakawa 100 AFG jet mill to give a mean particle size of 50 microns.

1 Kg of the jet milled powder was then formed into a dough in a Z-blade mixer using approximately 500 g of water and standard polymeric extrusion aids—Methocell and polyethylene oxide. The dough was then extruded using a high pressure ram extruder at a pressure of around 40 bar using a conventional monolith die. The extruded monolith was air dried for at least 12 hours by rotating slowly in ambient air to ensure it remained straight, although more rapid drying can be achieved using, for instance, air less drying. The monoliths had a diameter in the resin form of 10 mm with a length of 10 cm. These monoliths were then carbonised in flowing carbon dioxide at temperatures of between 650 and 720° C. with residence times at temperature of between 1 and 12 hours. The shrinkage during pyrolysis and the resistance of the monoliths was then measured using a conventional 4 point method. The resistance was also measured along the length of the monolith. The resistance as a function of temperature and time are shown in Table 2.

TABLE 2

| Time | Temperature C. | | | | | | | |
|---|---|---|---|---|---|---|---|---|
| (hours) | 650 | 660 | 700 | 720 | 800 | 1200 | 1300 | 1500 |
| 0.5 | | | | | 0.179 | 0.036 | 0.031 | 0.028 |
| 1 | 1386 (293) | 442 (94) | 57 (12) | 0.7 (0.15) | 0.129 | | | |
| 2 | 148 (31) | 43 (9) | | | | | | |
| 3 | 51 (11) | 7 (1.5) | | | 0.119 | | | |
| 6 | | 1.8 (0.4) | | | 0.089 | | | |
| 9 | | | | | 0.077 | | | |
| 12 | | 0. (0.2) | | | | | | |

It can be seen the resistance is strongly dependent upon both the pyrolysis temperature and the residence time. The variation in resistance with residence time is comprising as there is little or no change in the monolith weight or size. Without being bound to this explanation we believe that this resistance variation is caused by the presence of small amounts of high molecular weight molecules adsorbed onto the carbon surface that withdraw electrons from the carbon conduction bands leading to the higher resistance. These can only then be removed by holding for extended times where the time increases as the pyrolysis temperature decreases. The effect of residence time on resistivity for carbonisation at 650 and 660° C. is also shown in FIG. 8. It can be seen that minimum resistance is reached at 650° C. only for hold times in excess of approximately 9 hours.

The gradient of resistance along the monoliths is also a function of the temperature and time, with the resistance increasing along the tube. This is shown in FIG. 9. It can be seen that the gradient of resistance along the monolith decreases with the total resistance. We believe this is also due to the presence of impurities adsorbed on the carbon surface that are progressively removed along the length of the monolith with time on stream. This effect is reduced for shorter monolith segment lengths where the diffusion path length is shorter.

The resistance can be further reduced by heating the monoliths in a high temperature furnace in an inert gas such as helium or argon. The resistance of the monoliths heated at between 1200° C. and 1500° C. are shown in Table 2.

EXAMPLE 2

Modification of Carbon Monolith Resistance by Oxidative Treatment

The resistivity of the pyrolysed and heat treated carbon can be modified in a controlled fashion by introducing surface oxygen by holding the carbon materials in air at temperatures from 150 to 500° C., preferably between 200 and 400° C., for varying times where the temperature varies with the severity of the heat treatment. The temperature required to bring about this effect varies with the initial heat treatment temperature. For the carbon monoliths pyrolysed at 800° C. the effect of oxidation is as shown in FIG. 6 with a significant increase in resistance at only 200° C. over 200 hours. For the monoliths heat treated at higher temperatures, higher oxidation temperatures are required to achieve the desired increase in resistance. It can be seen from FIG. 12 that for the monoliths prepared at 1200° C. and 1300° C. oxidation at 380° C. brings about a significant increase in resistance after 5-10 hours exposure whilst for the 1500° C. monoliths there was little change in resistance even after 25 hours. Under these controlled conditions little or no carbon is removed from the monolith, there is predominantly oxygen addition and, over an extended period of time, there is essentially a linear increase in resistance.

At higher oxygen exposure temperatures removal of carbon occurs, eventually leading to mechanical failure of the monolith. Without being bound by this explanation we believe that, as in the case of the adsorbed high molecular weight materials, this effect is due to electron withdrawal from the carbon structure by the electro-negative oxygen group. This can cause significant problems if the heater is to be used in an air environment but can be used to control the monolith resistance if the heater is to be used in an inert gas environment, provided that the operating temperature does not exceed approximately 400° C. at which temperature the oxygen groups are removed from the surface.

Other chemical methods can also be used to modify the resistance characteristics such as treatment in nitric acid, hydrogen peroxide or with any other oxidizing species.

This combination of high temperature heat treatment and oxidation can be used to produce stable, controlled resistance monoliths, for use when heating gas streams containing oxygen.

EXAMPLE 3

Resisto-Jet Electrical Heating Using Carbon Monoliths

The heating performance of the carbon monoliths for use in the resisto-jet application has been measured using the device shown in FIG. 7. The monoliths are held between small shaped copper washers held in place with springs within a ceramic housing that allows operation at temperatures up to 1000° C. The end fittings allow the device to be operated at pressures up to 3bar absolute. Power is supplied to the monoliths via the springs with a maximum power input based on the available power supply of 60W (30V at 2A in a satellite system), although this is limited by the resistance characteristics of the monolith. The maximum monolith length in this device is 1-5 cm.

Thermocouples are mounted such that one sits just above the monolith surface measuring exit gas temperature and the second is mounted just inside the exit of the monolith. Gas, preferably nitrogen or argon, can be flowed through the monolith at between 100 and 10,000 $cm^3$/minute. Heating efficiency is quoted as the heat content of the gas exiting the monolith divided by the electrical input energy from the controlled power supply. The heating efficiency as a function of gas Reynolds number is shown in FIG. 10. We have also shown that the efficiency also increases with monolith length, with little additional benefit being achieved for monoliths of greater than 5 cm length for the 7 mm diameter monoliths. A further unique property of the monolith is shown in FIG. 11, which demonstrates the insensitivity of the exit gas temperature to gas flow through the monolith at constant applied voltage. It can be seen that for the longer monolith the gas temperature remains essentially constant at flows ranging from 400 to 2000 ml/min.

EXAMPLE 4

Purge Heater Application

The potential of the carbon monoliths in automotive purge heating has been measured using the device shown in FIG. 5. This device holds four 10 mm diameter×5 cm long monoliths. These were prepared with a high open area (64%, 1200 micron channel size) to minimise pressure drop and a thin wall structure (300 micron) to give the required resistivity, equivalent to a resin cell density of approximately 300 cells per square inch in the resin and 600 cells per square inch in the carbonised monolith. The monoliths used were prepared according to Example 1 using 10 micron milled resin powder. The dried monoliths were carbonised at 800° C. in flowing carbon dioxide for 45 minutes. The reduced residence was used as the subsequent high temperature thermal treatment had the same effect. They were then thermally stabilised in helium at 1300° C. for 30 minutes. They were subsequently treated in air at 380° C. for 4 hours to increase the resistance to the required level. After this series of treatments the monoliths had a typical resistance of ~0.076+/−0.005 ohm/cm. The monoliths were mounted in the purge heater as shown in FIG. 5 with a surface thermocouple attached to each monolith close to the inlet and outlet.

The purge heater was then connected to the purge air inlet of the standard MahleTennex LEVII canister, shown in FIG. 4, filled with 2.5 L of highly mesoporous BAX1100 carbon. This canister was instrumented with 7 thermocouples, six in the carbon beds and one (TC1) in the air inlet to the canister.

Within the beds 4 of the probes were in the second chamber of the canister (TC2-TC5) and two were in the first, main chamber (TC6 and TC7).

The assembly was then subjected to several adsorption-regeneration cycles, with and without the purge heater, using pentane as the challenge vapour. The adsorption cycles were carried out by passing 1 L/minute of air through a pentane saturator held at 10° C. and then through the canister via line 1 leaving the canister via line 2. The adsorption cycle was continued until pentane breakthrough was detected in line 2. In regeneration mode, air at 10 L/minute was passed through the purge heater, entering the canister via line 2 and leaving via line 3. Regeneration was continued for 30 minutes to give a total regeneration flow of 300 L, equivalent to 120 bed volumes.

Figure 14A:
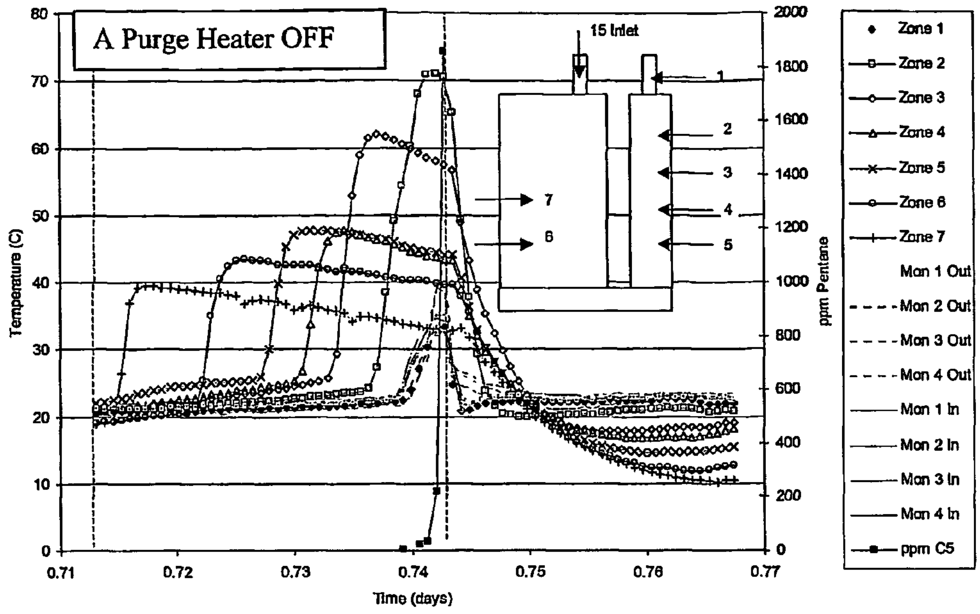

A typical temperature profile in the canister and purge heater, without the purge heater in operation during regeneration, is shown in FIG. 14*a*. The frontal adsorption of pentane through the canister can be seen with the temperature in the main, first, chamber rising initially to approximately 40° C. and the 4 zones in the second chamber reaching 47° C., 47° C., 63° C. and 71° C. respectively. Total pentane adsorption in this test was approximately 65 g. The temperature rise is indicative of the amount of pentane adsorbed and can be compared with temperatures of approximately 75° C. in all zones for a clean canister when the total pentane uptake was approximately 250 g. This shows that there has been reasonable adsorption in the first zone of the second chamber, that was exposed to clean, cold air during regeneration, but much lower adsorption throughout the first chamber. It can also be seen that, during regeneration, the temperatures in the first chamber dropped well below ambient, reaching ~10° C., with temperatures down to 15° C. in the second chamber.

Figure 14B:
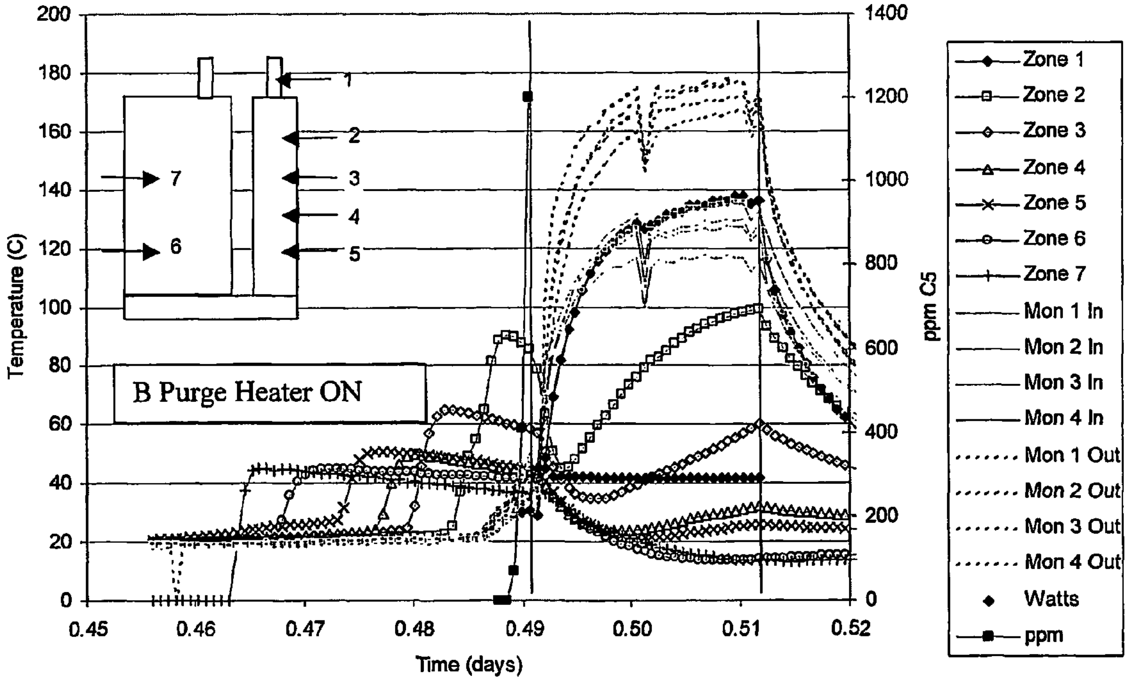

The results with the purge heater operating are shown in FIG. 14*b*. In this case the test was identical except that, the power to the purge heater was switched in when the regeneration purge flow was switched on. The power was set at approximately 40 W although this varied slightly with the monolith temperature. It can be seen that the monolith temperatures in the purge heater rose rapidly reaching a mean of 170° C. at the monolith outlet and approximately 135° C. at the monolith inlet. The gas temperature at the canister inlet reached 135° C. during the 30 minute regeneration cycle giving rise to an eventual temperature in zone 2 (inlet to the second chamber) of 100° C., 60° C. in zone 3 and 30° C. in zone 4. The temperatures in the first chamber behaved similarly to those in the absence of the purge heater. This reflects the high heat losses from this canister and that very little heat therefore reached the first chamber. The impact on the adsorption cycle can be seen from the temperature rises during adsorption. The temperatures in the first chamber are slightly higher than in the test without the purge heater (e.g. 45° C. vs. 40° C. without the purge heater in zone 7) indicating some increase in adsorption. The main difference is, however, in zone 2 where the carbon bed temperature reached 100° C. during regeneration. It can be seen that the bed temperature during adsorption has now reached >90° C., higher than for the clean canister, compared to 72° C. in the absence of the purge heater. This shows that this zone has been completely purged. In the cycles with the purge heater operational the pentane adsorption was 80 g, a 23% increase over the operation without the purge heater. A further improvement in performance would be expected with a canister designed to operate with the purge heater that minimised heat losses.

The invention claimed is:

1. A method of forming an electrically conductive synthetic porous carbon monolith by partially curing a phenolic resin to a solid, comminuting the partially cured resin, extruding the comminuted resin, sintering the extruded resin so as to produce a form-stable sintered product characterized in that the resistivity of the porous carbon monolith is controlled by varying the temperature and duration of the sintering step.

2. A heater for heating fluids comprising:

(a) a heater element comprising an electrically conductive porous carbon monolith;

(b) a plurality of fluid flow channels extending through said monolith; said channels being formed by a plurality of walls forming a cell structure in said monolith;

(c) said walls being composed of carbon particles of mean size 10-100 pm and the mean particle size being <10% of the wall thickness;

(d) said monolith being macro and microporous wherein the macroporosity derives from voids between said carbon particles (Dp), and the microporosity derives from internal porosity of the carbon particles generated by voids between micro-domains (Dp) of said particles.

3. The heater of claim 2, wherein the monolith has a surface area of at least 450 $m^2/g$ and a cell density up to 930 $cells/cm^2$ (6000 cells per square inch).

4. The heater of claim 2 wherein the monolith is the result of carbonising a resin having micro-domains (dp) in its structure.

5. The heater of claim 4 wherein the monolith is the result of:

(a) partially curing a phenolic resin to a solid;

(b) comminuting the partially cured resin;.

(c) extruding the comminuted resin;

(d) sintering the extruded resin so as to produce a form-stable sintered product; and (e) carbonising the form-stable sintered product.

6. The heater of claim 4 wherein the monolith has been subjected after carbonisation to a heat treatment at from 1200 to 15000° C. under an inert atmosphere or vacuum.

7. The heater as claimed in claim 5 wherein, after carbonisation, the monolith porous carbon has been activated by heating in steam or carbon dioxide or a mixture thereof.

8. The heater of claim 4 comprising a container in which there is an electrically conductive heater element connectable to an electrical power source, said container having a fluid inlet and a fluid outlet, and fluid entering the container via the inlet passes in contact with said heater element and then passes out through said outlet, said element being heated when an electric current is passed through said element.

9. A purge gas heater comprising a heater as claimed in claim 4 attached to a carbon containing canister which is adapted to be connected to a vehicle fuel system such that the canister adsorbs fuel vapours released from a vehicle when said vehicle is stationary or during refuelling.

10. The purge gas heater of claim 9, which is regenerable using hot air generated in the purge gas heater when the heater element is heated by the passage of an electric current.

11. The use of the heater of claim 2 as an adsorber for fuel vapours given off from engines.

12. The heater of claim 2 incorporated in a satellite microthruster to heat gases to provide thrust to the satellite.

13. A method of forming an electrically conductive synthetic porous carbon monolith in which;

(a) a channel is provided through the monolith defining a cell structure including walls in which the channel size is 100-2000 pm and the wall thickness is 100-2000 pm with an open area of 30-80%;

(b) the walls are of carbon particles of mean size 10-100 pm, the mean particle size being <10% of the wall thickness;

(c) the monolith is macro and microporous, the macroporosity deriving from voids between the carbon particles (Dp) and the microporosity deriving from internal porosity of the carbon particles generated by voids between micro-domains (dp) of said particles, said monolith being obtained by:

(f) partially curing a phenolic resin to a solid;

(g) comminuting said partially cured resin;

(h) extruding said comminuted resin;

(g) sintering said extruded resin so as to produce a form-stable sintered product; and (h) wherein the resistivity of the porous carbon monolith is controlled by varying the temperature and duration of the sintering step.

14. A method of forming an electrically conductive synthetic porous carbon monolith in which;

(a) the channels through the monolith define a cell structure in which the channel size is 100-2000 pm and the wall thickness is 100-2000 pm with an open area of 30-80%;

(b) the walls are of carbon particles of mean size 10-100 pm, the mean particle size being <10% of the wall thickness;

(c) the monolith is macro and mircoporous, the macroporosity deriving from voids between the carbon particles (Dp) and the microporosity deriving from internal porosity of the carbon particles generated by voids between micro-domains (dp) of said particles, said monolith being obtained by:

(d) partially curing a phenolic resin to a solid;

(e) comminuting said partially cured resin;

(f) extruding said comminuted resin;

(g) sintering said extruded resin so as to produce a form-stable sintered product; and (h) wherein the resistivity of the porous carbon monolith is produced by controlling the oxidation of said porous carbon monolith formed.

15. A heater for heating fluids comprising:

(a) an elongated casing having a longitudinal axis;

(b) a plurality of separate elongated porous carbon monolith heater elements having longitudinal axes extending parallel to said casing axis, and including channels extending parallel to said element axes;

(c) electrically conductive elements in contact with first and second ends of each heater element;

(d) electrical conductors connecting said electrically conductive elements in series so as to produce substantially equal voltage drops across each of said heater elements to raise the temperature thereof when connected to an electrical power source; and (e) inlet and outlet means in said casing for passing a fluid therethrough in contact with said heating elements.

16. The heater of claim 15 wherein the axes of said heater elements are arranged to form a substantially square pattern within said casing.

17. The heater of claim 15 including resilient means positioned between an internal surface of said casing and each of said heater elements.

18. The heater of claim 15 wherein;

(a) the axes of said heater elements are arranged to form a substantially square pattern within said casing; and (b) including resilient means positioned between an internal surface of said casing and each of said heater elements.

* * * * *